(12) United States Patent
Gueret et al.

(10) Patent No.: US 11,583,799 B2
(45) Date of Patent: Feb. 21, 2023

(54) PROCESS FOR CONDITIONING A CONTAINER COMPRISING A GRANULAR MATERIAL

(71) Applicant: L'Air Liquide, Société Anonyme pour l'Etude et l'Exploitation des Procédés Georges Claude, Paris (FR)

(72) Inventors: Vincent Gueret, Paris (FR); Guillaume Rodrigues, Le Plessis Trevise (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 470 days.

(21) Appl. No.: 16/662,896

(22) Filed: Oct. 24, 2019

(65) Prior Publication Data

US 2020/0129915 A1 Apr. 30, 2020

(30) Foreign Application Priority Data

Oct. 26, 2018 (FR) ...................................... 1859951

(51) Int. Cl.
*B01D 53/02* (2006.01)
*B01D 53/053* (2006.01)
*B01D 53/047* (2006.01)
*B65B 31/02* (2006.01)

(52) U.S. Cl.
CPC ....... *B01D 53/053* (2013.01); *B01D 53/0476* (2013.01); *B65B 31/02* (2013.01); *B01D 2253/108* (2013.01); *B01D 2257/40* (2013.01)

(58) Field of Classification Search
CPC .......... B01D 2253/108; B01D 2257/40; B01D 2259/4525; B01D 53/0476; B01D 53/053; B01J 20/186; B01J 20/30; B01J 20/3092; B01J 20/3458; B01J 20/3491; B65B 31/02; F17C 11/00
See application file for complete search history.

(56) References Cited

U.S. PATENT DOCUMENTS

| 5,658,370 | A | 8/1997 | Vigor et al. | |
| 6,051,051 | A | 4/2000 | Hees et al. | |
| 6,083,301 | A * | 7/2000 | Gary | B01D 53/02 95/130 |
| 6,131,368 | A | 10/2000 | Taramposch et al. | |
| 6,638,341 | B1 | 10/2003 | Spiegelman et al. | |
| 2006/0210454 | A1* | 9/2006 | Saxena | B01J 8/025 422/169 |
| 2009/0202655 | A1* | 8/2009 | Kuznicki | A61K 33/243 424/618 |
| 2011/0104494 | A1* | 5/2011 | Brandt | B01J 20/183 428/402 |
| 2013/0247886 | A1* | 9/2013 | Hamad | B01D 53/0476 123/704 |
| 2016/0045841 | A1* | 2/2016 | Kaplan | B01D 53/48 429/49 |
| 2016/0089637 | A1* | 3/2016 | Chang | B01D 53/228 502/401 |
| 2019/0033718 | A1* | 1/2019 | Kamimura | G03F 7/0046 |
| 2019/0291075 | A1* | 9/2019 | Yoon | B01D 53/047 |
| 2021/0113801 | A1* | 4/2021 | Wang | A61M 16/0093 |

FOREIGN PATENT DOCUMENTS

| EP | 0 693 309 | 1/1996 |
| EP | 1 038 795 | 9/2000 |

OTHER PUBLICATIONS

French Search Report and Written Opinion for corresponding FR 1859951, dated Jun. 28, 2019.

* cited by examiner

*Primary Examiner* — Christopher P Jones
(74) *Attorney, Agent, or Firm* — Elwood L. Haynes

(57) ABSTRACT

Process for conditioning a container including a granular material A enabling the adsorption of the nitrogen contained in a feed gas stream, including a step of injecting, into the container, a gas or a gas mixture G such that the adsorption capacity of the material A with respect to G is less than 10 Ncm$^3$/g at 25° C. and 1 atm.

8 Claims, No Drawings

PROCESS FOR CONDITIONING A CONTAINER COMPRISING A GRANULAR MATERIAL

BACKGROUND

The present invention relates to a process for conditioning a container comprising a granular material A enabling the adsorption of nitrogen.

The present invention will be applied both to the barrels of adsorbents, for example suppliers' barrels of adsorbents, and to the adsorbers.

Regarding the application to adsorbers, even though the present invention will first and foremost be applied to adsorbers of VSA (Vacuum Swing Adsorption gas separation process) type, the present invention will also be able to be applied to all adsorbers of PSA (Pressure Swing Adsorption gas separation processes) type:

VSA processes are pressure swing adsorption processes in which the adsorption is substantially carried out at atmospheric pressure, referred to as high pressure, i.e. between 1 bara and 1.5 bar, and the desorption is carried out at a pressure below atmospheric pressure, typically between 0.3 to 0.5 bar.

VPSA processes in which the adsorption is carried out at a high pressure substantially greater than atmospheric pressure, i.e. generally between 1.6 and 8 bara, preferentially between 2 and 6 bara, and the low pressure is below atmospheric pressure, typically between 30 and 800 mbara, preferably between 100 and 600 mbara.

PSA processes in which the adsorption is carried out at a high pressure significantly greater than atmospheric pressure, typically between 1.6 and 50 bara, preferentially between 2 and 35 bara, and the low pressure is above or substantially equal to atmospheric pressure, therefore between 1 and 9 bara, preferably between 1.2 and 2.5 bara.

Hereinafter, use will be made of the term (V)PSA which will encompass VSA, PSA, and VPSA.

(V)PSA cycles comprise at least the following steps: production, decompression, purge, recompression.

In the case of a V(P)SA O2 adsorber, the molecular sieve has the function of selectively retaining nitrogen with respect to oxygen and argon. This molecular sieve therefore has a very high affinity with respect to nitrogen, which changes very substantially with the temperature at which the material is exposed.

Conventionally, the material is activated at the adsorbent manufacturer's premises with preferentially dry air and then exposed to a flushing with dry air, with ultrapure nitrogen during phases during the filling of the adsorber in the factory in order to minimize contamination by atmospheric moisture. Thus, after filling, the adsorbent material is at equilibrium with nitrogen or air at atmospheric pressure and at the temperature of the factory.

Subsequently, the outside temperature will vary, during storage in the factory, transportation, or storage at the plant site with consequently an adsorption or a desorption of nitrogen (and of other constituents to a lesser extent) depending on whether the outside temperature is lower or higher than the filling temperature. This respiration of the adsorbent material leads to risks of pollution (in particular when the pressure in the container becomes lower than atmospheric pressure) and/or of exceeding the permissible adsorber pressure depending on the conditioning method conventionally selected.

On that basis, one problem that arises is that of providing an improved adsorber conditioning process.

SUMMARY

One solution of the present invention is a process for conditioning a container comprising a granular material A enabling the adsorption of the nitrogen contained in a feed gas stream, comprising a step of injecting, into the container, a gas or a gas mixture G such that the adsorption capacity of the material A with respect to G is less than 10 Ncm$^3$/g at 25° C. and 1 atm.

DESCRIPTION OF THE PREFERRED EMBODIMENTS

Depending on the case, the process according to the invention may have one or more of the features below:
 the container is a container intended to store the adsorbent in a manner that is impermeable to the air located outside of the container.
 the container is an adsorber.
 the adsorber is an adsorber of V(P)SA O2 type.
 said process comprises, after the injection step, a step of pressurizing the inside of the adsorber to a pressure of between 1.05 bar and 3 bar, preferably between 1.05 bar and 1.8 bar, even more preferentially between 1.1 and 1.5 bar.
 the injection step consists of an inflation with the gas G, a flushing of the gas G through the granular material A, inflations with the gas G, successive deflations or a combination of at least two of these methods. Note that in the case of a container intended to store the adsorbent, the injection will be carried out throughout the duration of the conditioning, in particular up to the end of the cooling necessary after the activation of the adsorbent.
 the adsorption capacity of the material A with respect to G is less than 5 Ncm$^3$/g at 25° C. and 1 atm.
 the granular material A is selected from zeolites of A and X structures exchanged at least partially with one or more elements selected from lithium, calcium, sodium, potassium, zinc or silver.
 the gas G is selected from argon, oxygen and helium.

Within the context of the invention, it is a question of conditioning the adsorber in the factory under a slight overpressure of a poorly adsorbable gas (relative to nitrogen) in order to minimize the respiration of the adsorbent during the temperature cycles to which the adsorber may be subjected during the transportation or storage thereof.

Depending on the filling conditions, including the composition of the gas mixture within the adsorber and the temperature of the factory, the filling pressure will be able to be adjusted so that the pressure is always below the maximum permissible pressure and is as far as possible above atmospheric pressure. The maximum permissible pressure is determined by the conditions of the process for the adsorbers, and is given by the adsorbent suppliers.

The invention applies more particularly to a PSA or V(P)SA O2 adsorber, the adsorbent of which is selected due to its strong affinity for nitrogen.

The conditioning gas will preferentially be argon, but may also be selected from O2 or helium. Helium representing the ideal case in terms of respiration of the adsorbent since the adsorption thereof is virtually zero, but it does prove more expensive.

The present invention will be described in greater detail with the aid of the example below.

The adsorber taken for the example is an axial adsorber with an internal diameter of 2 m that comprises a volume of LiLSX sieve of 2.5 m$^3$ and an additional void volume of 2.7 m$^3$.

At 25° C. and 1 atm, the N2, O2 and Ar capacities considered on an LiLSX are respectively 22.5 Ncm$^3$/g, 3.8 Ncm$^3$/g and 3.8 Ncm$^3$/g.

Two initial states are selected corresponding to extreme conditions of factory filling:

overpressure of 100 mbar and temperature of 10° C.

no overpressure and temperature of 30° C.

Here are the two final states corresponding to extreme conditions of on-site storage:

Temperature of 35° C.

Temperature of 0° C.

For each of the 2 cases, the impact of a filing with dry air and with argon was estimated (cf. Table 1)

TABLE 1

|  |  | Filling air | Filling air | Filling argon | Filling argon | Filling argon | Filling argon |
|---|---|---|---|---|---|---|---|
| Initial state | P (bara) | 1.1 | 1 | 1.1 | 1 | 1.5 | 1.5 |
|  | T (K) | 10 | 30 | 10 | 30 | 10 | 30 |
|  | YN$_2$ | 0.78 | 0.78 | 0 | 0 | 0 | 0 |
|  | YO$_2$ | 0.22 | 0.22 | 0 | 0 | 0 | 0 |
|  | YAr | 0 | 0 | 1 | 1 | 1 | 1 |
| Final state | P (bara) | 2.08 | 0.44 | 1.44 | 0.61 | 1.98 | 0.91 |
|  | T (K) | 35 | 0 | 35 | 0 | 35 | 0 |
|  | YN$_2$ | 0.83 | 0.74 | 0 | 0 | 0 | 0 |
|  | YO$_2$ | 0.17 | 0.36 | 0 | 0 | 0 | 0 |
|  | YAr | 0 | 0 | 1 | 1 | 1 | 1 |

It is observed that when the adsorber is conditioned with argon, the pressure variations in the closed adsorber are substantially lower than with a dry air filling. In particular, the maximum pressure reached with an air filling exceeds the maximum permissible pressure of a typical VSA adsorber (2 bara) whilst with an argon conditioning, this limit is far from being reached. The most favourable case is a conditioning at a pressure close to 1.5 bara that makes it possible to never exceed 2 bara and to drop below 0.9 bara when the temperature varies within a range from 0° C. to 35° C. in the adsorber during the storage or transportation thereof.

The greater the volume of the adsorber relative to the amount of adsorbent material that is selective with respect to nitrogen, the easier it will be to select a filling pressure range that makes it possible to stay within the [Patm-Pmax permissible] range. Note that the volume of the adsorber may be between 1 litre and 200 m$^3$.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for conditioning a container comprising a granular material enabling the adsorption of nitrogen contained in a feed gas stream, comprising a step of injecting, into the container, a gas or a gas mixture such that the adsorption capacity of the granular material with respect to the gas or gas mixture is less than 10 Ncm$^3$/g at 25° C. and 1 atm, the injection step consists of inflating with the gas or gas mixture.

2. The process according to claim 1, wherein the container is a container intended to store the granular material in a manner that is impermeable to air located outside of the container.

3. The process according to claim 1, wherein the container is an adsorber.

4. The process according to claim 3, wherein the adsorber is an adsorber of either VSA O2 type or VPSA O2 type.

5. The process according to claim 3, wherein said process comprises, after the injection step, a step of pressurizing the inside of the adsorber to a pressure of between 1.05 bar and 3 bar.

6. The conditioning process according to claim 1, wherein the adsorption capacity of the granular material with respect to the gas or gas mixture is less than 5 Ncm$^3$/g at 25° C. and 1 atm.

7. The conditioning process according to claim 1, wherein the granular material is selected from zeolites of A and X structures exchanged at least partially with one or more elements selected from lithium, calcium, sodium, potassium, zinc and silver.

8. The conditioning process according to claim 1, wherein the gas or gas mixture is selected from argon, oxygen and helium.

* * * * *